(12) United States Patent
Frederick

(10) Patent No.: US 9,813,115 B2
(45) Date of Patent: Nov. 7, 2017

(54) RF SYSTEM USING PR-ASK WITH ORTHOGONAL OFFSET

(71) Applicant: Clairvoyant Technology LLC, Durham, NC (US)

(72) Inventor: Thomas J. Frederick, Chapel Hill, NC (US)

(73) Assignee: Clairvoyant Technology LLC, Durham, NC (US)

(*) Notice: Subject to any disclaimer, the term of this patent is extended or adjusted under 35 U.S.C. 154(b) by 0 days.

(21) Appl. No.: 15/110,994

(22) PCT Filed: Dec. 4, 2014

(86) PCT No.: PCT/US2014/068484
§ 371 (c)(1),
(2) Date: Jul. 12, 2016

(87) PCT Pub. No.: WO2015/105600
PCT Pub. Date: Jul. 16, 2015

(65) Prior Publication Data
US 2016/0344452 A1  Nov. 24, 2016

Related U.S. Application Data

(60) Provisional application No. 61/926,568, filed on Jan. 13, 2014.

(51) Int. Cl.
*H03C 5/00* (2006.01)
*H04L 27/04* (2006.01)
(Continued)

(52) U.S. Cl.
CPC ......... *H04B 5/0031* (2013.01); *H04B 5/0062* (2013.01); *H04L 27/367* (2013.01)

(58) Field of Classification Search
USPC .......... 375/219, 240, 240.28, 259, 271, 279, 375/280, 284, 285, 295, 300, 306, 316,
(Continued)

(56) References Cited

U.S. PATENT DOCUMENTS 7,409,012 B2 * 8/2008 Martin ............... H04L 27/2007
                                                        332/144
8,184,743 B2    5/2012 Scarpa et al.
(Continued)

FOREIGN PATENT DOCUMENTS

WO    2009152281 A2    12/2009

OTHER PUBLICATIONS

Jin Li et al, Analysis and Simulation of UHF RFID system, ICSP2006 Proceedings.*
(Continued)

*Primary Examiner* — Linda Wong
(74) *Attorney, Agent, or Firm* — Kilpatrick Townsend & Stockton LLP

(57) ABSTRACT

An RF system using PR-ASK with orthogonal offset is disclosed. In some embodiments, the system includes a PR-ASK signal generator and an orthogonal offset generator. The PR-ASK signal generator can produce a signal representing a sequence of symbols, for example, RFID symbols. The orthogonal offset generator can shift the PR-ASK signal trajectory away from the origin while maintaining the time domain requirements for an RFID signal, such as waveform edge rise and fall times. In some embodiments stored waveforms incorporating the controlled orthogonal offset are used to synthesize a sequence of symbols. The stored waveforms may also include nonlinear and/or linear predistortion to reduce computational complexity. The waveforms can be represented in Cartesian coordinates for use in a direct conversion transmitter or (Continued)

polar coordinates for use in a polar modulation transmitter. An RFID system can also include a receiver to receive incoming RFID signals.

18 Claims, 14 Drawing Sheets

(51) Int. Cl.
*H04B 5/00* (2006.01)
*H04L 27/36* (2006.01)

(58) Field of Classification Search
USPC ....... 375/320, 346, 347, 340, 324, 354, 362, 375/135, 136, 146, 147, 220–222, 240.02, 375/240.26–240.27, 256, 267, 272, 273, 375/275, 278, 302, 308, 322, 323, 325, 375/329, 358
See application file for complete search history.

(56) References Cited

U.S. PATENT DOCUMENTS

| | | | |
|---|---|---|---|
| 8,503,546 B1 | 8/2013 | Ashrafi | |
| 2005/0226312 A1* | 10/2005 | Koslar | H04B 1/69 375/142 |
| 2006/0269294 A1* | 11/2006 | Kikuchi | H04B 10/5051 398/161 |
| 2007/0086548 A1 | 4/2007 | Rawlins et al. | |
| 2007/0206705 A1* | 9/2007 | Stewart | G06K 7/0008 375/316 |
| 2007/0297531 A1* | 12/2007 | Arisawa | G06K 7/0008 375/297 |
| 2008/0030336 A1* | 2/2008 | Endo | G06K 7/0008 340/572.1 |
| 2008/0056419 A1* | 3/2008 | Lee | H04B 1/71632 375/355 |
| 2009/0023402 A1 | 1/2009 | Shimizu et al. | |
| 2009/0043361 A1* | 2/2009 | Baumgartner | A61N 1/37211 607/60 |
| 2009/0174495 A1* | 7/2009 | Arisawa | G06K 7/0008 332/115 |
| 2009/0206991 A1* | 8/2009 | Keller | G06F 12/0246 340/5.72 |
| 2009/0237218 A1 | 9/2009 | Kim | |
| 2011/0013726 A1* | 1/2011 | Voinigescu | H03C 1/36 375/298 |
| 2013/0106580 A1* | 5/2013 | Bae | H04L 25/4917 340/10.1 |
| 2014/0211576 A1* | 7/2014 | Bartling | G11C 29/36 365/189.16 |
| 2014/0218172 A1* | 8/2014 | Sadr | H03M 13/2957 340/10.1 |
| 2014/0225804 A1* | 8/2014 | Wild | G01S 3/48 343/876 |

OTHER PUBLICATIONS

Clairvoyant Technology LLC, International Patent Application No. PCT/US14/68484, International Search Report and Written Opinion, dated Mar. 6, 2015.

* cited by examiner

RF SYSTEM USING PR-ASK WITH ORTHOGONAL OFFSET

BACKGROUND ART

The Gen2 RFID protocol includes an amplitude modulation (AM) mode, referred to as phase reversal amplitude shift keying (PR-ASK) in the protocol specification, which can achieve good spectral occupancy. However, the amplitude of the radio frequency (RF) signal passes through zero. This gives 100% amplitude modulation depth and produces phase discontinuities with 180 degree phase jumps. Many RFID readers are designed using RF power amplifiers (RFPAs) with high power efficiency, such as class-AB or class-C. These high efficiency power amplifiers tend to have reduced linearity as compared to class-A amplifiers. These high efficiency power amplifiers work better when the amplitude modulation of the transmission signal is reduced. While ideal PR-ASK modulation can achieve good spectral occupancy, the 100% AM depth and the phase discontinuities can create significant distortion for power efficient RFPAs commonly used in RFID readers. This distortion causes spectral regrowth which can significantly degrade the spectral occupancy.

Some RFID reader designs include nonlinear predistortion on the baseband transmission signal to improve overall transmitter linearity and mitigate the spectral regrowth problem. This nonlinear predistortion is calculated using input-output characterization of the RFPA. The input-output characterization can be very difficult to achieve accurately when the transmission signal modulation depth is at or near 100%, such as with PR-ASK. If digital predistortion is used, the amplitude and phase distortion of the RF power amplifier is difficult to measure when the RF signal trajectory goes through the origin. Thus, ideal PR-ASK has good spectral occupancy but is difficult for many power efficient RFPAs to reproduce linearly and furthermore is difficult to implement RFPA predistortion for due to its deep amplitude modulation depth.

DISCLOSURE OF EMBODIMENTS OF THE INVENTION

Embodiments of the present invention provide apparatus and methods for generating a new form of the phase reversal amplitude shift keying (PR-ASK) transmission signals in a radio frequency (RF) system. The apparatus according to embodiments of the invention can for example be used in an RFID system to generate transmit signals fully compliant with the ISO-18000-63 or EPCGlobal Gen2 specification and having spectral occupancy better than conventional PR-ASK signals, but without the fully modulated amplitude wherein the signal trajectory passing through the origin. The transmit signal synthesis can support both direct conversion radio architecture and polar modulation architectures.

An RF system according to at least some embodiments of the invention includes a PR-ASK signal generator together with an orthogonal offset generator connected to the PR-ASK signal generator. The PR-ASK signal generator can produce a fully modulated AM signal representing a symbol and/or a sequence of symbols. The orthogonal offset generator is capable of shifting the PR-ASK signal trajectory away from the origin to create a new type of amplitude and phase modulated signal which has continuous phase modulation and reduced amplitude modulation depth as a result of a controlled orthogonal offset. The resulting offset shifted PR-ASK signal is substantially easier for many RFPAs to reproduce with good quality due to this reduced AM depth.

In an RFID system, the resulting offset shifted PR-ASK signal maintains the time domain requirements for an RFID waveform, such as edge rise and fall times and the symbol edge-to-edge timing specifications. The resulting offset shifted PR-ASK signal maintains the frequency domain requirements for an RFID waveform with improved spectral occupancy. The RF system can also include an RF source to produce a carrier wave, and an RF amplifier connected to the RF source and the orthogonal offset generator for transmitting the sequence of symbols modulated onto the carrier wave to produce an AM signal as the transmitter waveform. Orthogonally offset PR-ASK modulation will be denoted OPR-ASK herein.

In other embodiments of the invention, the RF system may convert an OPR-ASK signal from Cartesian to polar representation. Unlike PR-ASK which has phase discontinuities of 180 degrees and is extremely difficult to generate with a polar transmitter, the new ORP-ASK modulation has continuous phase modulation which is readily produced in a polar transmitter. The polar representation can be used as input to a polar modulation transmitter system, thus producing a sequence of symbols modulated onto the carrier wave as a polar signal.

In some embodiments of the invention, the RF system can also include a digital pre-distortion block connected after the orthogonal offset generator. In some embodiments of the invention, a transmitter nulling offset generator can be included to cancel nuisance offsets introduced in the transmit baseband circuitry and RF mixer. In some embodiments the transmitter nulling offset generator can be implemented at least in part by a summer. In some embodiments of the invention, the RF system includes a gain and phase imbalance equalizer to cancel nuisance gain and phase mismatch between the in-phase and quadrature-phase paths of the transmit baseband circuitry and RF mixer.

In at least some embodiments of the invention, stored OPR-ASK waveforms, which may incorporate the orthogonal offset, are used to synthesize a required sequence of RFID symbols as a transmitter signal. Each stored OPR-ASK waveform represents an RFID symbol. The stored waveforms may also include nonlinear and/or linear predistortion applied to substantially undistorted waveforms to reduce computational complexity in the digital signal processor. The stored waveforms may also mathematically include a rotation about the origin. In some embodiments the waveforms are represented in Cartesian coordinates for use in a direct conversion transmitter. In some embodiments, the stored waveforms are represented in polar coordinates for use in a polar modulation transmitter. In any embodiment the RFID system can include a receiver to receive incoming RFID signals.

The waveforms can be stored in a storage medium such as a memory and can include a reference waveform and a reversed phase version of the reference waveform for each symbol. A multiplexer can be connected to the storage medium to select one of the waveforms in accordance with the symbol required in the sequence at a given time. Two multiplexers and a phase select switch can alternatively be used.

In operation, a processor repeatedly determines a current polarity state for a stored OPR-ASK waveform corresponding to an RFID symbol in a sequence of RFID symbols, where each waveform is a PR-ASK waveform that includes an orthogonal offset as described above. The processor retrieves each waveform from a storage medium, either a reference waveform or a reversed phase version of the reference waveform in accordance with the current polarity state. Each reference waveform represents an RFID symbol usable in the sequence of RFID symbols. The processor uses these waveforms to assemble the sequence of RFID symbols. The processor, together with a computer usable storage medium, such as a memory to store waveforms and executable computer program code or firmware, can be used as the means to carry out a transmitter synthesis embodiment of the invention.

BRIEF DESCRIPTION OF THE DRAWINGS

FIG. 3 has parts FIG. 3A, FIG. 3B, and FIG. 3C.

FIG. 5 has parts FIG. 5A, FIG. 5B, and FIG. 5C.

FIG. 10 is an example for direct conversion radios. FIG. 10 is in four parts, FIG. 10A, FIG. 10B, FIG. 10C, and FIG. 10D.

FIG. 11 is an example for polar modulation radios. FIG. 11 is in four parts, FIG. 11A, FIG. 11B, FIG. 11C, and FIG. 11D.

BEST MODES FOR CARRYING OUT THE INVENTION

Figure 1:
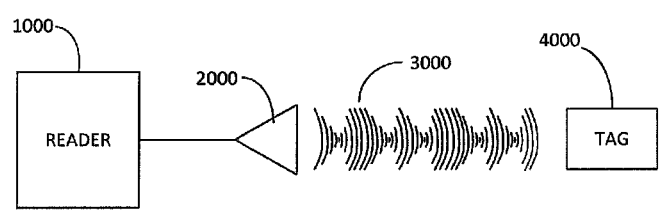
FIG. 1 is a functional block diagram of an example operating environment for an RFID system with an amplitude modulated reader-to-tag communications link.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. The term "block" can be used to refer to hardware, software, or a combination of the two that performs a particular function, group of functions, step, or collection of steps. Comparative, quantitative terms such as "less" or "more", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

This disclosure has to do with generating signals for RFID transmission. The conventional approach to generating modulated transmission signals is to use digital signal processing (DSP) techniques which produce a "digital signal", which is a quantized and sampled signal. These digital signals may be denoted such as x(n), where the argument is a variable such as n, m, or k. These variables represent the sample index, typically under a uniform sampling period $T_S$. The digital signal is passed from the DSP to a digital-to-analog converter (DAC) which produces a continuous time version of the signal, commonly using a zero-order-hold representation at the DAC output. For band limited signal reproduction the DAC output is followed by a low pass or band pass reconstruction filter which produces a continuous time, continuous amplitude version x(t) of the digital signal x(n), where we have replaced the sampled time argument "n" with the continuous time argument "t". The signal name "x" remains the same to indicate the sampled time and continuous time signals represent the same signal, even though there will generally be scaling differences and small time delays in the two signal representations. This Nyquist sampling theory and practice of sampled data systems is well-known to those skilled in the art.

A block diagram of the operating environment of an example RFID reader 1000 using amplitude modulated reader-to-tag link communications 3000 is shown in FIG. 1. The reader 1000 is connected to one or more antennas 2000, which radiate the modulated transmit signal 3000 to one or more tags 4000. Some types of RFID tags decode commands from the reader which are encoded in the amplitude modulation of the reader's RF carrier signal. In some cases the modulation depth of the reader's RF carrier is specified to be from 80% to 100%. Examples of this are the ISO 18000-63 protocol and EPCGlobal C1G2 protocol, also informally known as "Gen2".

As with some other digital signaling techniques, RFID information is represented in data-1 and data-0 intervals.

Gen2 encodes commands to the tags using pulse interval encoding (PIE). In PIE, the information is contained in the time interval between pulses. For Gen2, the protocol uses a short pulse interval for a data-0 and a longer pulse interval for a data-1. Still longer intervals are used for other special symbols known in the protocol as rtcal and trcal. The rtcal symbol is used to tell the tag what time interval threshold to use for decoding data-0 verses data-1. The trcal symbol is used to tell the tag what subcarrier frequency to use when responding to the reader's commands. There is also a start-of-command symbol called delimiter which is simply a pulse of fixed width approximately 12.5 microseconds long. Because of the passive and semi-passive nature of most Gen2 tags, a "pulse" is defined as a short, deep modulation of the RF carrier. In other words, a Gen2 pulse is a brief absence of the RF carrier. The duration of the short data-0 interval is also sometimes referred to as the type A reference interval, or "tari". Some figures in this disclosure contain time domain plots which are normalized by tari for clarity.

Note that although the example embodiments described herein are focused on the Gen2 protocol for ultra-high frequency (UHF) in the 900 MHz region, the methods and apparatus described in the following can readily be applied to high frequency (HF) RFID readers in the 13.56 MHz band, or to the 2.45 GHz microwave band, or other RFID readers in the HF, UHF, or microwave bands. The principal commercial application being addressed herein is efficient implementation of amplitude modulated reader-to-tag communications. Amplitude modulation is commonly used in RFID where the tags are very inexpensive and use envelope detection to decode communications from the reader. The modulated reader-to-tag signal 3000 may also contain phase modulation, but many types of tags only use the envelope for decoding.

Figure 2:
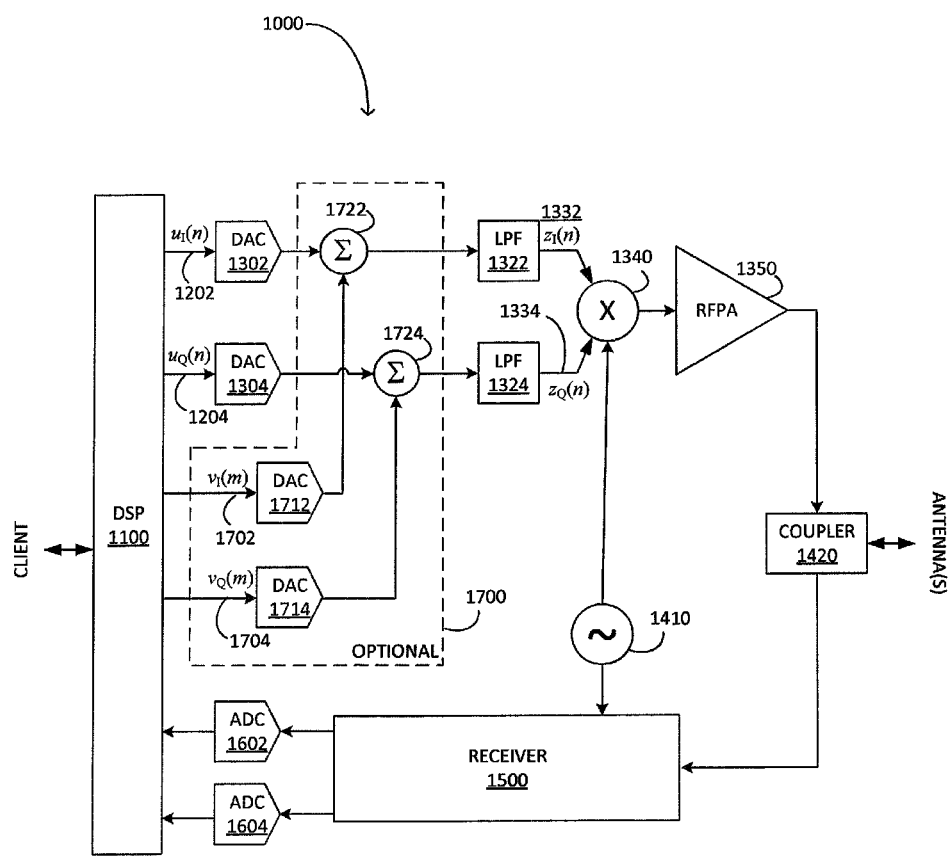
FIG. 2 is a block diagram of an RFID reader using a direct conversion transmitter for generating the amplitude and phase modulated reader-to-tag communications link.

FIG. 2 illustrates an architecture for RFID reader 1000 using a direct conversion transmitter to generate the amplitude and phase modulated RF signal. In this example the in-phase 1202 and quadrature-phase 1204 baseband signals, $u_1(n)$ and $u_Q(n)$, respectively, are produced digitally in software and/or hardware using the digital signal processor (DSP) 1100. The baseband signals 1202 and 1204 are inputs to the digital-to-analog converters (DACs) 1302 and 1304 respectively, which produce baseband analog output signals. FIG. 2 shows an optional DC offset circuit 1700, which may serve as the orthogonal offset generator and in this example includes in-phase and quadrature-phase DC offset signals $v_1(m)$ 1702 and $v_Q(m)$ 1704, respectively, converted to analog signals through DACs 1712 and 1714, respectively. Signals 1702 and 1704 may also serve as transmitter nulling signals or can serve for both nulling and orthogonal offset generation. A different sampling index m is used since the sampling rate of 1702 and 1704 will typically be different from the main baseband signals 1202 and 1204. The analog DC offset signal outputs from DACs 1712 and 1714 are inputs to the optional DC offset summation circuits 1722 and 1724 which add the DC offsets to the main transmit baseband signals from DACs 1302 and 1304, respectively. The DC offset signals and summation circuitry can have two possible functions. One function may be to trim out nuisance DC offsets and RF carrier feed through in the baseband analog circuitry and quadrature mixer. This function is conventional and known to those skilled in the art. An additional function according to some embodiments of the disclosure herein may be to sum in an intentional DC offset orthogonal to the PR-ASK signal modulation. This creates a new modulation format this disclosure will denote as offset phase reversal amplitude shift keying (OPR-ASK). This will be described in great detail below.

The transmit baseband signals are passed through low pass filters (LPF) 1322 and 1324 to produce the final baseband modulation signals $z_1(t)$ 1332 and $z_Q(t)$ 1334, respectively. Note that the filters 1322 and 1324 could precede the summing junctions 1722 and 1724 in alternative embodiments since the DC offsets are typically constant signals with no modulation. The signals 1332 and 1334 are baseband inputs to quadrature modulator 1340, which also gets local oscillator input $\cos(\omega t)$ from the RF source 1410, which provides the carrier. The quadrature modulator ideally creates the signal $$z_{ideal}(t)=z_1(t)\cos(\omega t)+z_Q(t)\sin(\omega t).$$

and ideally the inputs 1332 and 1334 to the quadrature modulator are perfect continuous time replicas of the digital signals 1202 and 1204, respectively, plus the optional DC offset signals $v_1(m)$ 1702 and $v_Q(m)$ 1704, respectively. Note that continuous time signals use time variable t as the argument while sampled time signals use k, m, or n as the argument. The continuous time representation of $u_1(n)$ is denoted $u_1(t)$, and the band limited sampling theory which ties the two together is known to those skilled in the art.

Returning to FIG. 2, the output signal from quadrature modulator 1340 passes into the RF power amplifier (RFPA) 1350 which produces a high power version applied to the TX-RX coupler 1420. Ideally the RFPA 1350 has a linear transfer function from input to output. However, all power amplifiers exhibit some nonlinearity. The nonlinearity can cause increased spectral occupancy and adjacent channel interference problems. The nonlinearity is often characterized by two functions: amplitude distortion and amplitude-to-phase distortion. Amplitude distortion typically has a more significant effect on the spectral regrowth phenomenon and the degradation of spectral occupancy in the transmit signal. Amplitude distortion is the effect wherein the gain of the amplifier depends on the input drive level. This is also sometimes referred to as gain compression and gain expansion (both of which can be exhibited on the same device). Amplitude-to-phase distortion is a secondary problem, which also must be mitigated for high performance systems. Amplitude-to-phase distortion is the phenomenon wherein the phase shift through the RFPA varies depending on the input drive level. A common technique to mitigate the problem of amplitude and phase distortion is digital predistortion in the DSP 1100. This will be discussed further in subsequent paragraphs.

Continuing with FIG. 2, the coupler 1420 sends substantially most or all of the high power transmit signal to the antennas, while any signal coming into the reader from the antennas is mostly or all passed into the receiver 1500. The receiver typically produces in-phase and quadrature-phase baseband receiver outputs which are inputs to analog-to-digital converters (ADCs) 1602 and 1604. The sampled and quantized baseband receiver output is passed into the DSP 1100 for processing and decoding. The DSP 1100 interfaces with a client device to report tag responses.

Figure 3:
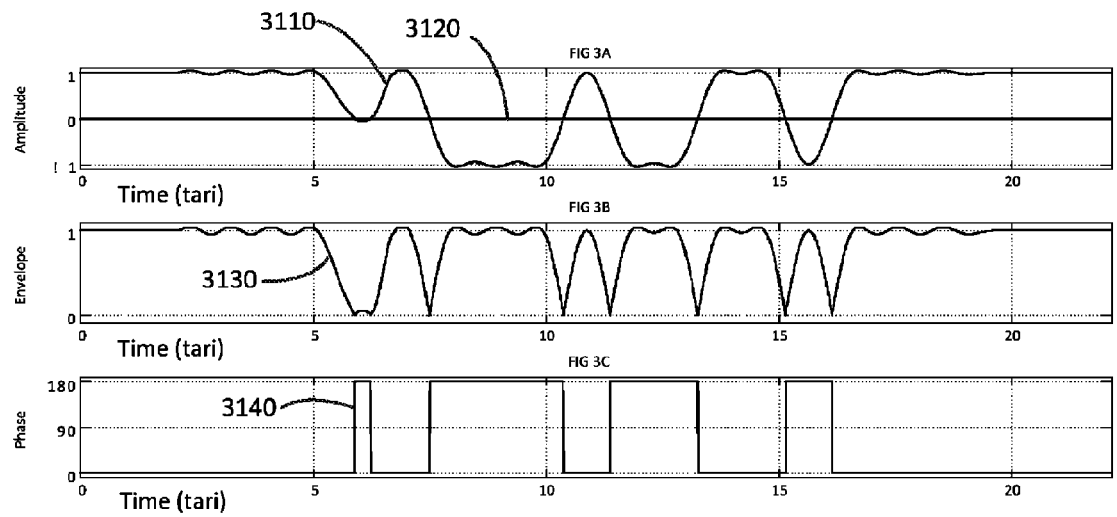
FIG. 3 is a set of plots of a PR-ASK signal as may be used in an RFID reader transmission.

FIG. 3 shows a plot of a conventional PR-ASK modulated command signal in an RFID system. FIG. 3A shows an example PR-ASK baseband waveform 3110 using a type A reference interval, or tari, of 12.5 microseconds and a data-1 length of 1.88×tari, or 23.5 microseconds. In FIG. 3 the time axis has been normalized to tari. The DSP generated PR-ASK signal will be denoted s(n) or s(t), depending on whether it is being referenced in the digital or analog domain, respectively. The signal 3110 is the in-phase part of the conventional PR-ASK signal in this example embodiment, and the quadrature-phase signal part 3120 is also shown in FIG. 3A. In this example the quadrature-phase part 3120 is exactly zero. Without loss of generality this disclosure will always normalize the signal amplitude to one since the overall gain structure of the RFID reader's transmitter is not important with respect to this new transmit signal modulation method.

FIG. 3B shows the PR-ASK signal envelope 3130, which represents the envelope of the RF signal transmission 3000 from the RFID reader 1000. Passive RFID tags 4000 decode the reader commands from the envelope of the RFID reader transmission. The PR-ASK signal envelope 3130 is fully modulated since under ideal conditions with nuisance offsets fully cancelled the envelope goes all the way to zero which produces 100% modulation depth. Under realistic conditions it is impossible to perfectly cancel nuisance offsets and some residual offset will remain on the in-phase and quadrature-phase baseband circuitry and due to the mixer 1340. These imperfections will cause the modulation depth to be less than 100%, although we will still refer to PR-ASK as being a fully modulated signal since the intention of conventional PR-ASK is 100% amplitude modulation depth. Another common way to specify amplitude modulation depth is as the ratio in decibels of full scale to minimum amplitude. Full scale in our examples is 1, which is the reference amplitude our example signals are scaled to. In practice it is accepted that the modulation depth will should be near 30 dB or better, with 30 dB representing $10^{-30/20}=0.0316$ residual envelope, or about 97% amplitude modulation. In spite of these imperfectly un-cancelled offsets this specification will refer to these PR-ASK implementations as "fully modulated".

FIG. 3C shows the PR-ASK signal phase 3140 which is seen to jump between two values, 0 degrees and 180 degrees, as the baseband signal 3110 crosses back and forth through zero going positive and negative. FIG. 3C represents the PR-ASK phase under ideal conditions with nuisance offsets fully cancelled. As discussed in the previous paragraph, in conventional PR-ASK there is frequently residual un-cancelled offsets in the DACs, baseband circuitry, and mixer 1340 which affect the signal phase characteristics. The effect of offsets on the phase depends on the magnitude and polarity of the uncontrolled offsets on both the in-phase and quadrature-phase circuitry. The phase may or may not have abrupt 180 degree phase jumps, but it will nevertheless have extremely high slew rates in terms of degrees per second. Passive RFID tags typically do not have local oscillators with which to coherently demodulate the RFID transmission, so phase modulation is transparent to the RFID tags. However, such high slew rates and/or abrupt phase jumps make polar transmitter implementations impractical.

In alternative embodiments of the conventional PR-ASK signal generation the in-phase and quadrature-phase parts 1202 and 1204, respectively, may be approximately equal to one another. In other words, the DSP 1100 output to the transmit DACs 1302 and 1304 could be $u_1(n)=\sqrt{2}\cdot s(n)$ and $u_Q(n)=\sqrt{2}\cdot s(n)$, where the $\sqrt{2}$ factor is merely to maintain the normalized amplitude as previously noted. This implementation can be advantageous to maximize the utilization of the transmit DAC circuitry.

Figure 4:
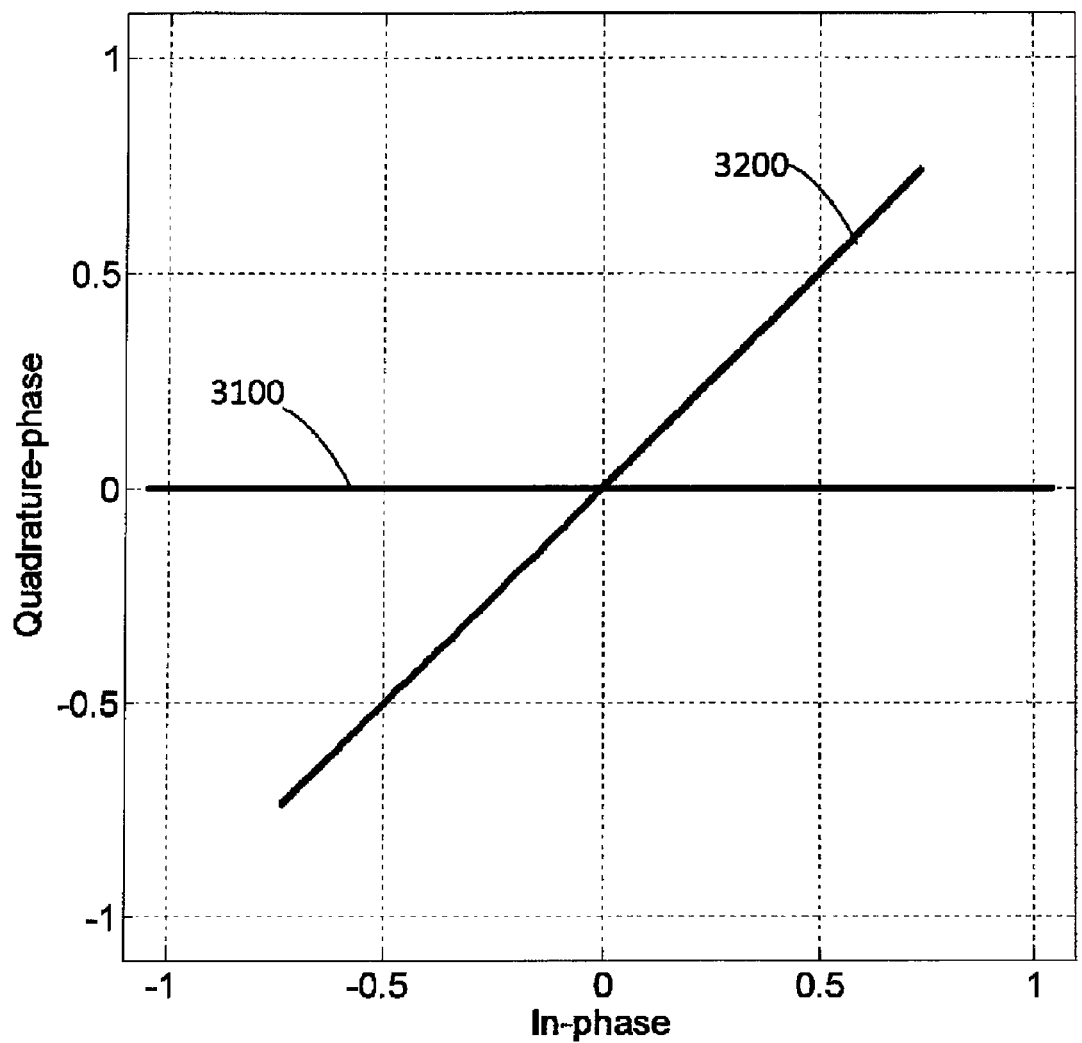
FIG. 4 is a phase plane graph to illustrate the signal trajectory of PR-ASK.

Here we introduce a useful signal representation we will term the phase plane, which is a representation of the baseband transmit signal or baseband equivalent transmit signal as a parametric equation of the in-phase and quadrature-phase components as a function of time, either continuous time t or sampled time n. For example, $$x=u_1(t) \text{ and } y=u_Q(t),$$

which produces plots as shown in FIG. 4. In the parametric equations above "x" refers to the in-phase, or real part, and "y" refers to the quadrature-phase, or imaginary part of the complex signal. Without considering the effects of baseband digital predistortion, the curves described by the parametric equations above are straight lines in the phase plane as shown by signal trajectories 3100 and 3200. The trajectory 3100 in FIG. 4 is the phase plane plot of the PR-ASK signal shown in FIG. 3A. The trajectory 3200 is the phase plane plot of the signal when 1302 and 1304 are $$u_1(n)=\sqrt{2}\cdot s(n), \text{ and}$$

$$u_Q(n)=\sqrt{2}\cdot s(n),$$

as briefly mentioned in the preceding paragraph. This is seen to result in the trajectory on a $\theta=45$ degree angle, but the length, or amplitude, is the same as 3100 and the signal trajectory still ideally passes through zero in the phase plane, which leads to the fully modulated 100% modulation depth and a phase signal with 180 degree jump discontinuities. More generally, any angle $\theta$ can be used for the trajectory $$s^\theta(n)=s(n)\cdot e^{j\theta},$$

where $j=\sqrt{-1}$. This equation simply rotates the trajectory angle in the phase plane but the envelope remains the same as in FIG. 3B and the phase signal is the same as in FIG. 3C except for a phase offset of $\theta$.

As mentioned in the preceding paragraph, the phase plane trajectories are straight lines when signal predistortion is not considered. When baseband digital predistortion is used the effects is that the phase plane trajectory would generally not travel on a straight line segment but on some curve which is dependent on the characteristics of the RFPA distortion. If offset nulling and trimming were included the trajectory would be shifted slightly depending on the characteristics of the nuisance offsets in the baseband and mixer circuitry. If gain and phase imbalance compensation is included this would further alter the baseband signal trajectory. Note that offset nulling and gain/phase imbalance equalization can be referred to as linear predistortion, and nonlinear predistortion and linear predistortion can sometimes just be referred to as predistortion. These effects are not included in FIG. 4 for clarity. However, if nonlinear predistortion and/or linear predistortion were included in the outputs to the transmit DACs, it does not depart from the disclosure herein. Indeed, the goal of digital predistortion is to invert the effects of the offsets, gain and phase mismatches, and amplitude and phase distortion in the analog circuitry so that the final high power transmitter output signal represents the ideal signal modulation as closely as possible, and therefore the phase plane trajectory of the transmitter output baseband equivalent representation is very close to a straight line because the effects of the analog circuit imperfections are ideally cancelled by the baseband digital predistortion.

In the conventional PR-ASK modulation scheme described above at any angle $\theta$, the PR-ASK signal trajectory passes through zero in the phase plane creating a number of problems for the RFID reader system design. Many RF power amplifier (RFPA) architectures exhibit significant nonlinear behavior as the signal trajectory passes near the phase plane origin. Furthermore, attempts to linearize the RFPA using baseband digital predistortion inside the DSP can be complicated by estimating the amplitude and phase distortion characteristics at very low signal levels as the signal trajectory goes near the phase plane origin. Conventional designs use a transmitter offset nulling generator to minimize nuisance offsets in the baseband and mixer circuitry, which commonly can reduce the offsets to well under 5% of the full scale signal. Frequently the transmitter offset nulling generator performs well enough for the fully modulated PR-ASK signal to have 99% modulation depth, or a modulation depth of 40 dB (since $10^{-40/20}$=0.01).

Figure 5:
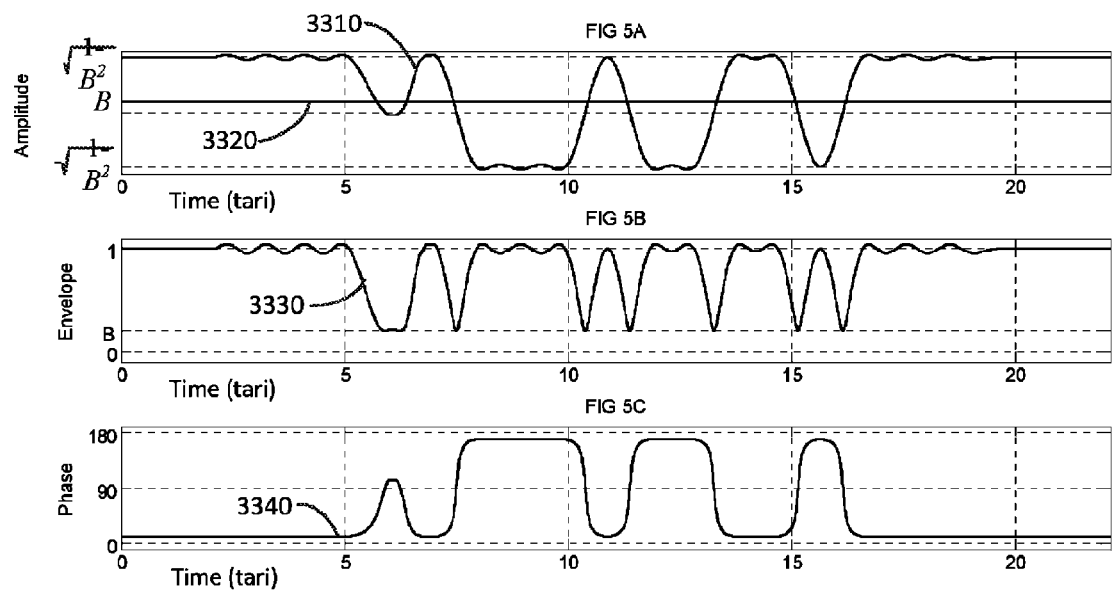
FIG. 5 is a set of plots of the newly disclosed OPR-ASK signal as may be used in an RFID reader transmission.

FIG. 5 shows a plot of one embodiment of a new modulation format denoted as offset phase reversal amplitude shift keying (OPR-ASK). The PR-ASK modulated signal s (n) in an RFID system is scaled and offset from the origin in the signal phase plane by adding a small orthogonal constant value whose magnitude is denoted as "B", resulting in $$s_B(n)=s(n)\cdot\sqrt{1-B^2}+jB.$$

The in-phase portion of $s_B(n)$ is scaled by $\sqrt{1-B^2}$ so that we maintain the unity normalization. FIG. 5A shows an example OPR-ASK baseband waveform with in-phase 3310 and quadrature-phase 3320 signals. As in FIG. 3, the FIG. 5 time axis has been normalized to tari. FIG. 5B shows the envelope 3330 of the example OPR-ASK waveform in FIG. 5A. FIG. 5C shows the signal phase 3340 for the example OPR-ASK waveform in FIG. 5A.

This example clearly illustrates two significant advantages of OPR-ASK over conventional PR-ASK. FIG. 5B shows that the OPR-ASK signal envelope never goes close to zero. The Gen2 specification calls for a minimum modulation depth of 80%. The OPR-ASK modulation depth is given by $$M=1-B,$$

which means that B≤0.2 to comply with the Gen2 specification. Unlike conventional PR-ASK, the new OPR-ASK modulation allows the RFID design engineer choice in the modulation depth via the parameter 0<B≤0.2. The second advantage of OPR-ASK is that the phase modulation is continuous, as illustrated in FIG. 5C. Unlike the phase signal of PR-ASK, which has jump discontinuities as illustrated in FIG. 3C, the phase signal 3340 varies smoothly and continuously between its two extreme values. The total range of phase modulation is always less than 180 degrees. For large values such as 0.1≤B≤0.2, the transmitter nulling offset generator can reduce nuisance offset to levels such that they have minimal impact on the phase and envelop signals of the OPR-ASK signal.

Figure 6:
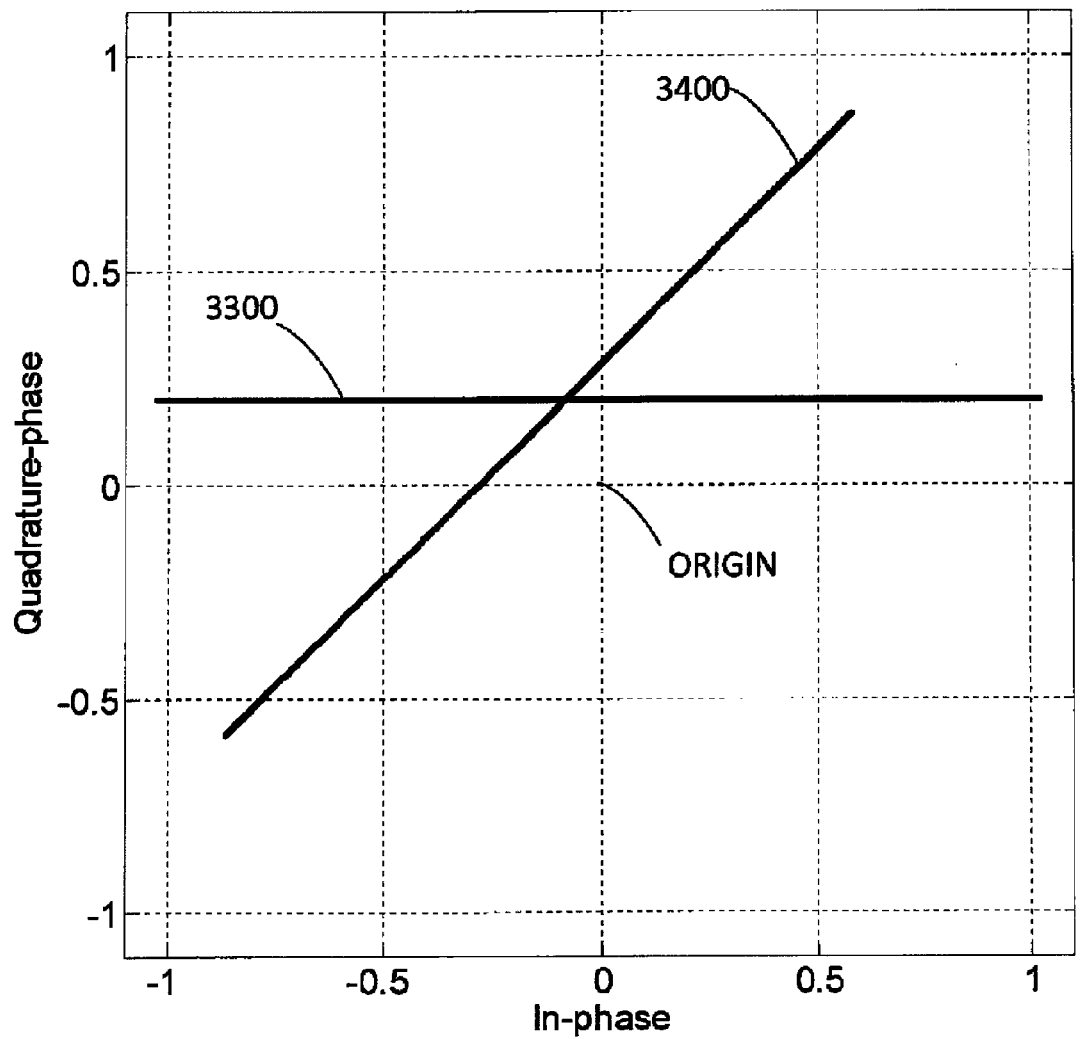
FIG. 6 is a phase plane graph to illustrate the signal trajectory of OPR-ASK.

FIG. 6 shows the phase plane trajectory 3300 for the OPR-ASK example signal illustrated in FIG. 5A. It can be seen that the signal trajectory 3300 is offset from the real axis by B. As with conventional PR-ASK, the OPR-ASK signal trajectory can be at any arbitrary angle θ. The equation below illustrates how to rotate the OPR-ASK signal $s_B$ (n) to any angle θ, $$s_B^\theta(n)=s_B(n)\cdot e^{j\theta}=(s(n)\cdot e^{j\theta}\cdot\sqrt{1-B^2})+j(B\cdot e^{j\theta}).$$

FIG. 6 shows the phase plane trajectory for the example OPR-ASK signal on a 45 degree angle 3400. Note that the signal trajectory remains a minimum distance of B away from the origin.

It is important for the offset B to be approximately orthogonal to the trajectory of the PR-ASK signal modulation component in the phase plane. This ensures that the amplitudes of the signal symbol waveforms are approximately equal which is a requirement of the Gen2 and ISO 18000-63 specification. If the offset B is not substantially orthogonal to the signal modulation, then signal envelope levels would alternate in amplitude and degrade the decoding margin for the tags, and may violate the Gen2 specification even for moderately small offsets B.

There are significant advantages to the OPR-ASK modulation technique. Many high efficiency RFPA architectures, such as deep class-AB and class-C amplifiers, exhibit significant amplitude and phase distortion for signal levels near zero. Conventional PR-ASK modulation is 100% modulation depth and will always produce very low signal levels. Furthermore, if baseband digital predistortion is used then the new OPR-ASK modulation format makes it much easier to characterize the RFPA nonlinearity as compared to conventional PR-ASK. This is primarily because the amplitude and phase distortion does not need to be measured near the origin in the phase plane. Finally, the spectral occupancy of OPR-ASK modulation is typically less than conventional PR-ASK. To see this, let the power spectral density of PR-ASK be denoted S(f). Then it is easy to see that the power spectral density of OPR-ASK is $$S_B(f)=(1-B^2)\cdot S(f)+B^2\cdot\delta(f),$$

where δ(f) is the Dirac delta function. Thus, the introduction of the orthogonal offset moves a small fraction of the OPR-ASK signal power to f=0, in baseband equivalent representation, or to the RF carrier frequency when considering the passband representation. Assuming the maximum value of B=0.2, the (1–$B^2$) scaling factor on the modulated power spectrum component S(f) above represents a 0.18 dB reduction. Therefore, the modulated power spectrum is slightly reduced in OPR-ASK as compared to PR-ASK. The main technical and commercial advantages of OPR-ASK come from its reduced modulation depth and its continuous phase modulation. The reduced modulation depth reduces the nonlinear distortion produced by power efficient RFPAs and also makes it easier to implement nonlinear predistortion, both of which lead to improved spectral occupancy by reducing spectrum regrowth in the transmitter system. The continuous phase modulation enables polar transmitter architectures for Gen2 RFID which were not practical for PR-ASK signals due to the phase discontinuities.

Using OPR-ASK, a system designer can, as an example use 80% to 95% modulation depth by selecting parameter 0.05<=B<=0.2. For purposes of this disclosure, this modulation depth is less than a "fully modulated" signal because the modulation depth has been intentionally and specifically limited by a controlled orthogonal offset; the reduced modulation depth is not due to impairments in the radio electronics and/or nulling offset generator limitations. A good reader design will still be able to cancel the nuisance offsets so that they are small relative to the controlled orthogonal offset. Fully modulated PR-ASK signals ideally exhibit 100% modulation, but sometimes the modulation level may be as bad as 97% due entirely to poor offset cancellation. This is undesirable since the less-than −100% modulation depth is due to unintentional offsets whose magnitude and phase are unknown and may adversely affect the tags' abilities to decode symbols due to imbalance between positive and negative waveforms. OPR-ASK modulation is reduced amplitude modulation depth by design using a controlled orthogonal offset, which would usually be selected to be larger than residual nuisance circuitry offsets. This range of modulation depth keeps the orthogonal offset large relative to un-cancelled nuisance offsets.

Figure 7:
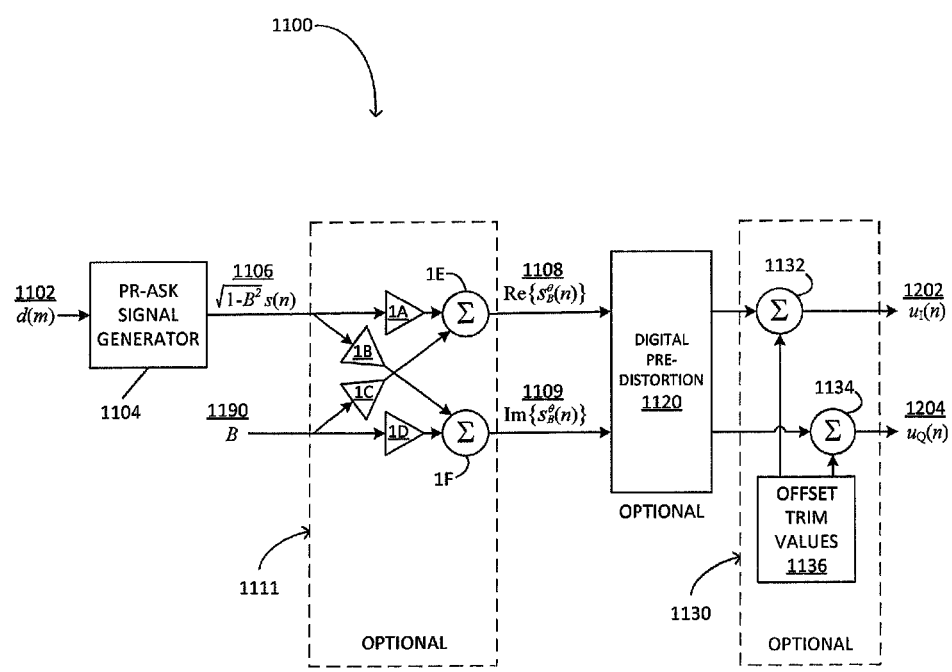
FIG. 7 is a block diagram of an embodiment for generating the OPR-ASK transmit signal within a DSP in a direct conversion RFID reader system.

FIG. 7 shows a block diagram of one embodiment of the disclosure on DSP 1100. The RFID signal transmission sequence is encoded in the digital signal d(m) 1102. The digital signal d(m) may be a pulse code modulated representation or some other discrete representation of the RFID signal transmission. Signal 1102 is an input to the PR-ASK signal generator 1104, which produces a scaled PR-ASK signal 1106, $\sqrt{1-B^2} \cdot s(n)$. The sample index n at the output is different from the sample index m at the input because the sampling rates are generally different. As discussed previously the signal 1106 is scaled so that the envelope resulting after orthogonal offset addition of B will be normalized to unity. This is essentially for ease of analysis, and in practice the signals will be scaled to optimize signal-to-quantization noise given the word width on the DSP and/or scaled to optimize other criteria. Those skilled in the art understand the design criteria and tradeoffs involved in DSP systems.

The PR-ASK signal generator 1104 may be based on conventional Nyquist filtering techniques or it may be based on optimization algorithms such as those shown in the PCT Patent Application entitled, "Waveform Synthesis for RFID Transmitters," Serial Number PCT/US2013/074897, filed on Dec. 13, 2013, incorporated herein by reference. Signal 1106 may be directly output as in-phase component 1202 to the DAC, while the offset B 1190 is output on the orthogonal channel 1204. This is the mode of operation illustrated in FIG. 5A. FIG. 7 shows an optional rotation 1111 consisting of four multiplications 1A, 1B, 1C, 1D, and two additions 1E, 1F. The weights of the multiplications depend of the desired rotation angle θ and are generated from Euler's formula $$e^{j\theta} = \cos\theta + j\sin\theta,$$

therefore $$s_B^\theta(n) = s_B(n) \cdot e^{j\theta} = (\sqrt{1-B^2} \cdot s(n) + jB)(\cos\theta + j\sin\theta)$$

$$s_B^\theta(n) = (\sqrt{1-B^2} \cdot s(n)\cos\theta - B\sin\theta) + j(\sqrt{1-B^2} \cdot s(n)\sin\theta + B\cos\theta)$$

From which we see that multiplier 1A has weight cos θ, multiplier 1B has weight sin θ, multiplier 1C has weight −sin θ, and multiplier 1D has weight cos θ. The outputs of adders 1E and 1F are the real and imaginary parts of $s_B^\theta(n)$, 1108 and 1109, respectively. Note that if no rotation is desired, θ=0, then the multiplier weights reduce to 1A=1D=unity and 1B=1C=zero. This is the same as simply omitting these components for θ=0.

Continuing with FIG. 7, digital predistortion block 1120 may optionally be included to apply predistortion to the signal $s_B^\theta(n)$. Nuisance DC offset and carrier feed through trimming can optionally be done by adding small additional offset component, as shown by the nulling subsystem 1130 in FIG. 7. Optional summation components 1132 and 1134 together with the offset trim estimates 1136 serve as a transmitter nulling offset generator to remove unwanted carrier feed-through. Alternatively, nuisance DC offset and carrier feed through trimming can be done by using auxiliary DACs 1712 and 1714 as shown in FIG. 2, which is not shown in FIG. 7. In either case, digital signals 1202 and 1204 are passed out from the DSP 1100 to the transmit DACs 1302 and 1304. It is also common to optionally perform gain and phase imbalance equalization on the baseband signal. This is not shown in FIG. 7 but is well-known to those skilled in the art. When nonlinear predistortion 1120 is performed the gain/phase equalization must be done after the nonlinear predistortion 1120, although it may be placed before or after 1130.

An alternate embodiment of the disclosure is to use the optional DACs 1712 and 1714 of FIG. 2 to add in the orthogonal offset. In this case the signals from FIG. 2 would be Signal 1202: $u_I(n) = \sqrt{1-B^2} \cdot s(n)\cos\theta$ Signal 1204: $u_Q(n) = \sqrt{1-B^2} \cdot s(n)\sin\theta$ Signal 1702: $v_I(m) = -B\sin\theta$ Signal 1704: $v_Q(m) = B\cos\theta$ Signals 1702 and 1704 may also include transmitter nulling offsets summed in as desired. This embodiment has several disadvantages including extra analog circuitry, less precision in the orthogonal offset due to imperfections in the analog circuitry, and a more cumbersome digital predistortion implementation, if predistortion is used.

Note that any modulation angle θ in the phase plane is easily accommodated with the direct conversion architecture of FIG. 2. The fundamental idea is that a specific, intentional ("controlled") offset is added orthogonally to the conventional PR-ASK signal so that the phase plane signal trajectory stays away from the origin. The offset orthogonality ensures that the two extremes of the OPR-ASK signal have approximately the same amplitude. This OPR-ASK has the advantages over conventional PR-ASK previously discussed. Because the added offset is orthogonal to the PR-ASK component it is uncorrelated with the PR-ASK and it simply adds the carrier spectral component. Others skilled in the art may find alternative embodiments for injecting a carrier component which is essentially orthogonal to the PR-ASK signal modulation. For example, it may be possible to sum in an orthogonal carrier offset within the radio RF circuitry. Such alternative embodiments are still within the spirit of this disclosure and should be considered covered within this specification.

Figure 8:
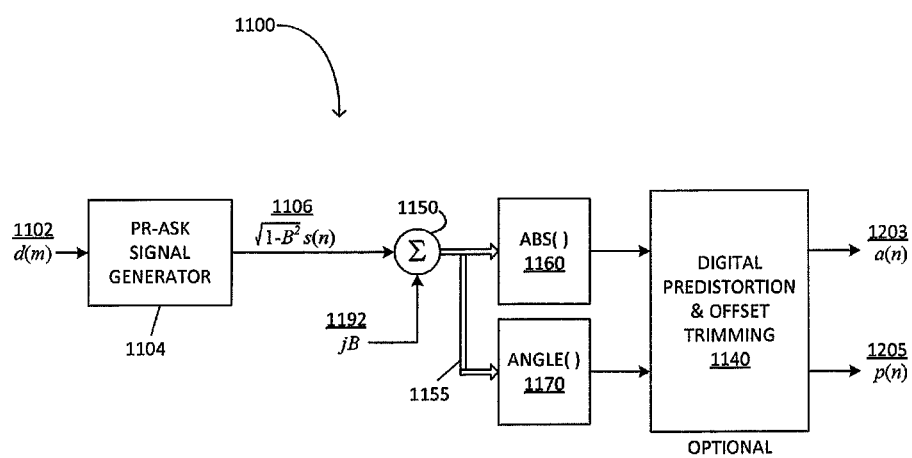
FIG. 8 is a block diagram of an alternative embodiment for generating the OPR-ASK transmit signal within a DSP for a polar modulation RFID reader system.

FIG. 8 shows a block diagram of DSP 1100 to produce amplitude 1203 and phase 1205 signals, a(n) and p(n) respectively, for an alternate embodiment of the disclosure applied to a polar transmitter RFID reader. Additional discussion of a polar transmitter can be found in the aforementioned Patent Application PCT/US2013/074897. Additional discussion of polar transmitters can be found in the PCT Patent Application entitled, "Polar Transmitter for an RFID Reader," filed in the U.S. Receiving Office on even date herewith, claiming priority from U.S. Provisional Patent Application 61/937,789, filed on Feb. 10, 2014. In FIG. 8, the RFID signal transmission sequence encoding d(m) 1102 is input to the PR-ASK signal generator 1104 to produce output 1106. Summer 1150 adds the quadrature phase offset jB 1192 to provide the orthogonal offset and create the new OPR-ASK modulation signal, which is then passed as input to absolute value function 1160 and angle calculation function 1170. Note the output of summer 1150 is a complex signal which is represented in the block diagram as a wide arrow as in 1155. The functions 1160 and 1170 produce the amplitude and phase signals, respectively. The DSP may optionally include a combined digital predistortion and offset trimming block 1140. The offset trimming provides a transmitter nulling offset. The final amplitude 1203 and phase 1205 signals are sent to the transmit DACs. A variation on the embodiment shown in FIG. 8 would be to move the digital predistortion processing before the 1160 and 1170 components. This does not depart from the ideas conveyed herein.

A signal generation technique wherein only one polarity of a waveform is stored and a polarity generator is used cannot be used directly with the orthogonal offset incorporated into the stored waveforms. This is because the polarity generator, both for Cartesian based direct conversion radios and polar modulation radios would incorrectly modify the orthogonal offset. Thus, the example embodiments illustrated here in FIG. 7 and FIG. 8 implement nonlinear and linear predistortion as separate functional blocks after the orthogonal offset has been added. The nonlinear predistortion cannot happen before the orthogonal offset is added since the offset affects the drive level into the RFPA. Linear predistortion is typically used to mitigate offsets, gain and phase imbalance in the baseband and mixer, and carrier feed through in the mixer. These linear impairments occur in the baseband and mixer before the signal reaches the RFPA where the dominant nonlinear distortion occurs. The linear predistortion, to mitigate the baseband and mixer linear impairments, must therefore occur after the nonlinear predistortion. Given this ordering of operations:

(1) adding a controlled orthogonal offset,
(2) nonlinear predistortion, and
(3) linear predistortion (offset and gain/phase imbalance equalization), the predistortion operations cannot be combined in the stored waveform synthesis using only a single reference waveform for each symbol. For OPR-ASK, both the reference waveform and the phase reversed waveform must be stored for each symbol. The following figures and text disclose concepts of how to implement stored waveform transmit synthesis techniques which are also capable of integrating the nonlinear and linear predistortion into the stored waveforms, even when using the OPR-ASK modulation technique.

Figure 9:
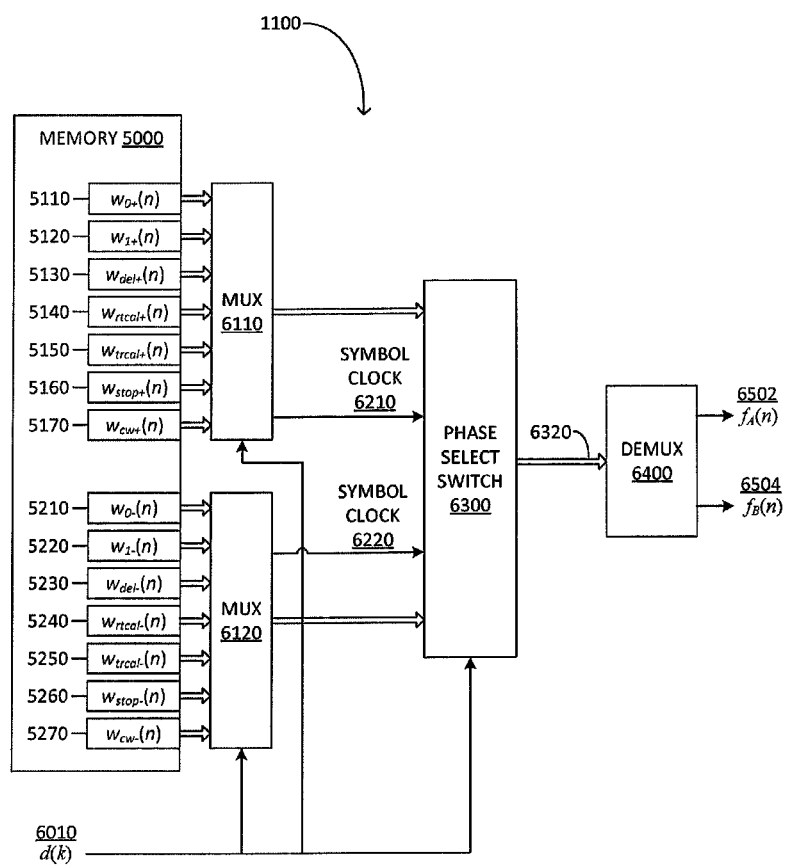
FIG. 9 is a block diagram of a transmit signal synthesis technique using stored waveform tables.

FIG. 9 is a block diagram of a system for DSP 1100 wherein two alternate phases of the symbol waveforms are stored in a storage medium, memory 5000 associated with DSP 1100. The memory could be internally integrated into DSP 1100, or external volatile or nonvolatile memory that DSP 1100 has access to. There are seven waveforms shown in FIG. 9:

$w_{0+}(n)$, 5110, the data-0 waveform associated with the positive OPR-ASK data-0 symbol;
$w_{1+}(n)$, 5120, the data-1 waveform associated with the positive OPR-ASK data-1 symbol;
$w_{del+}(n)$, 5130, the delimiter waveform associated with the positive OPR-ASK delimiter symbol;
$w_{rtcal+}(n)$, 5140, the rtcal waveform associated with the positive OPR-ASK rtcal symbol;
$w_{trcal+}(n)$, 5150, the trcal waveform associated with the positive OPR-ASK trcal symbol;
$w_{stop+}(n)$, 5160, the stop waveform associated with the positive OPR-ASK stop symbol; and
$w_{cw+}(n)$, 5170, the continuous wave (CW) waveform associated with the positive OPR-ASK CW symbol.

Note that there is no "stop" data symbol defined in the Gen2 specification, but it may be implied in that a final rising edge of the RF envelope is needed to define the final data symbol within a reader-to-tag command. It must also be pointed out that the terms "positive" and "negative" with regard to OPR-ASK modulation must be generalized from their normal meaning Positive and negative are properties of real numbers. The PR-ASK signal 1106 is real valued where "positive" and "negative" waveforms take their usual meanings Since OPR-ASK is a complex valued modulation technique, we must generalize these meanings. When this disclosure refers to a "positive" OPR-ASK waveform it is meant the portion of the waveform resulting from the positive scaled PR-ASK signal 1106, possibly including zero as well. When this disclosure refers to a "negative" OPR-ASK waveform it is meant the portion of the waveform resulting from the negative scaled PR-ASK signal 1106, possibly including zero as well. This disclosure will also use the term "reference" for the positive waveform and "reversed" or "reversed phase" to refer to the negative version.

As shown in FIG. 9, the DSP memory 5000 also contains waveforms associated with phase reversed OPR-ASK waveforms as follows:

$w_{0-}(n)$, 5210, the data-0 waveform associated with the reversed OPR-ASK data-0 symbol;
$w_{1-}(n)$, 5220, the data-1 waveform associated with the reversed OPR-ASK data-1 symbol;
$w_{del-}(n)$, 5230, the delimiter waveform associated with the reversed OPR-ASK delimiter symbol;
$w_{rtca-}(n)$, 5240, the rtcal waveform associated with the reversed OPR-ASK rtcal symbol;
$w_{trcal-}(n)$, 5250, the trcal waveform associated with the reversed OPR-ASK trcal symbol;
$w_{stop-}(n)$, 5260, the stop waveform associated with the reversed OPR-ASK stop symbol;
$w_{cw-}(n)$, 5270, the continuous wave (CW) waveform associated with the reversed OPR-ASK CW symbol.

More generally, there may be multiple versions of the waveforms depending on the variety of link configurations supported for the Gen2 air interface. There may be multiple versions of the delimiter and data-0 symbols depending on the frame sync implementation and link configurations. These variations do not depart from the ideas disclosed herein.

As shown in FIG. 9, the RFID transmit information is encoded in a symbol sequence d(k) 6010, which the index k is used here to indicate a discrete sequence. The sampling rate of this sequence is typically non-uniform because of the different lengths of the RFID commands. The DSP 1100 has one or more mux logic apparatus which use the symbols within the sequence 6010 to select from a plurality of waveforms to read and output from memory 5000. FIG. 9 shows two multiplexers, 6110 and 6120. In the example implementation of FIG. 9 multiplexer (mux) 6110 selects which of the positive reference phase waveforms to output based on the current symbol d(k), while mux 6120 selects which of the reversed reference phase waveforms to output based on the current symbol d(k). In this embodiment the DSP has a phase selection switch apparatus 6300 which performs an analogous function as the previously discussed polarity generator. The phase select switch 6300 alternates between the mux 6110 output and mux 6120 output every new symbol, except if the new symbol is a delimiter or a CW symbol, in which case the phase select switch does not alternate. The mux implementation has a record of how long each waveform symbol is, and after the complete waveform has been transferred from memory a symbol clock is provided so as to make the system move on to the next symbol in the sequence 6010. FIG. 9 shows each mux 6110 and 6120 providing a symbol clock output, 6210 and 6220, respectively. There are a significant number of ways to implement this whether it is done in software, in hardware logic gates, or in some programmable gate array. FIG. 9 shows a block diagram of one possibility.

Continuing with FIG. 9, phase select switch 6300 routes the correct phase waveform to the demultiplexer (demux) 6400. Note that wide arrows such as 6320 in FIG. 9 represent complex valued signals, whether in Cartesian or polar representation. The demux 6400 separates the complex signal representation into the component signals to be output to the DACs. The component signals $f_A(n)$ 6502 and $f_B(n)$ 6504 may be Cartesian representation signals $u_1(n)$ 1202 and $u_Q(n)$ 1204 for use in a direct conversion radio such as FIG. 2, or the component signals $f_A(n)$ 6502 and $f_B(n)$ 6504 may be polar representation signals a(n) 1203 and p(n) 1205 for use in a polar modulation transmitter architecture. Therefore, while FIG. 9 refers to DSP 1100 as in the direct conversion architecture, the system illustrated in FIG. 9 is equally applicable to polar transmitter architectures.

Figure 10:
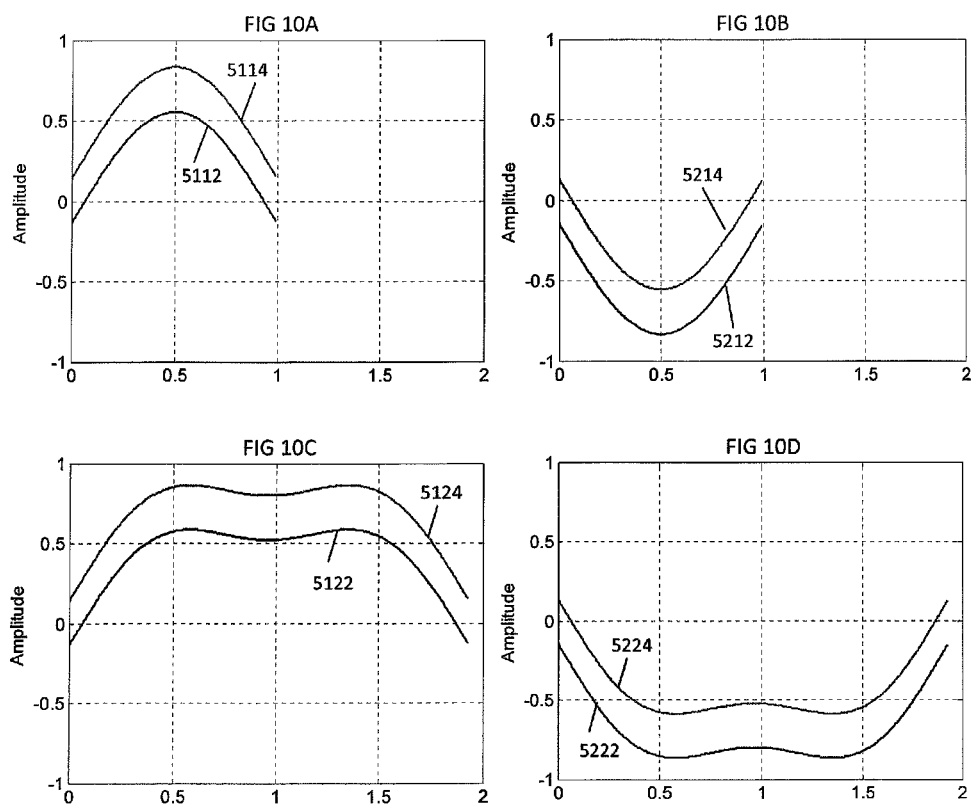
FIG. 10 are plots showing example OPR-ASK waveforms as would be used in the stored waveform table based synthesis technique of FIG. 9.

FIG. 10 shows plots of example waveforms which would be stored in memory 5000 for data-0 and data-1 signals for a direct conversion Cartesian representation. The time axis in each of the plots is normalized to tari. In FIG. 10A the positive data-0 waveform is shown for a direct conversion Cartesian representation, where signal 5112 is the in-phase part and signal 5114 is the quadrature-phase part. In FIG. 10B the phase reversed data-0 waveform is shown for a direct conversion Cartesian representation, where signal 5212 is the in-phase part and signal 5214 is the quadrature-phase part. In FIG. 10C the positive data-1 waveform is shown for a direct conversion Cartesian representation, where signal 5122 is the in-phase part and signal 5124 is the quadrature-phase part. In FIG. 10D the phase reversed data-1 waveform is shown for a direct conversion Cartesian representation, where signal 5222 is the in-phase part and signal 5224 is the quadrature-phase part. These signals are examples for use with the direct conversion radio as in FIG. 2. The signals are modulated along a 45 degree axis with a 135 degree orthogonal offset, such as in signal trajectory 3400 shown in FIG. 6. Other orientations of the modulation are equally possible. Other types of waveforms such as rtcal, delimiter, etc., may be similarly constructed. The orthogonal offset used in FIG. 10 was chosen to generate 80% modulation depth, though any modulation depth from 80% to 100% is included within these concepts.

Figure 11:
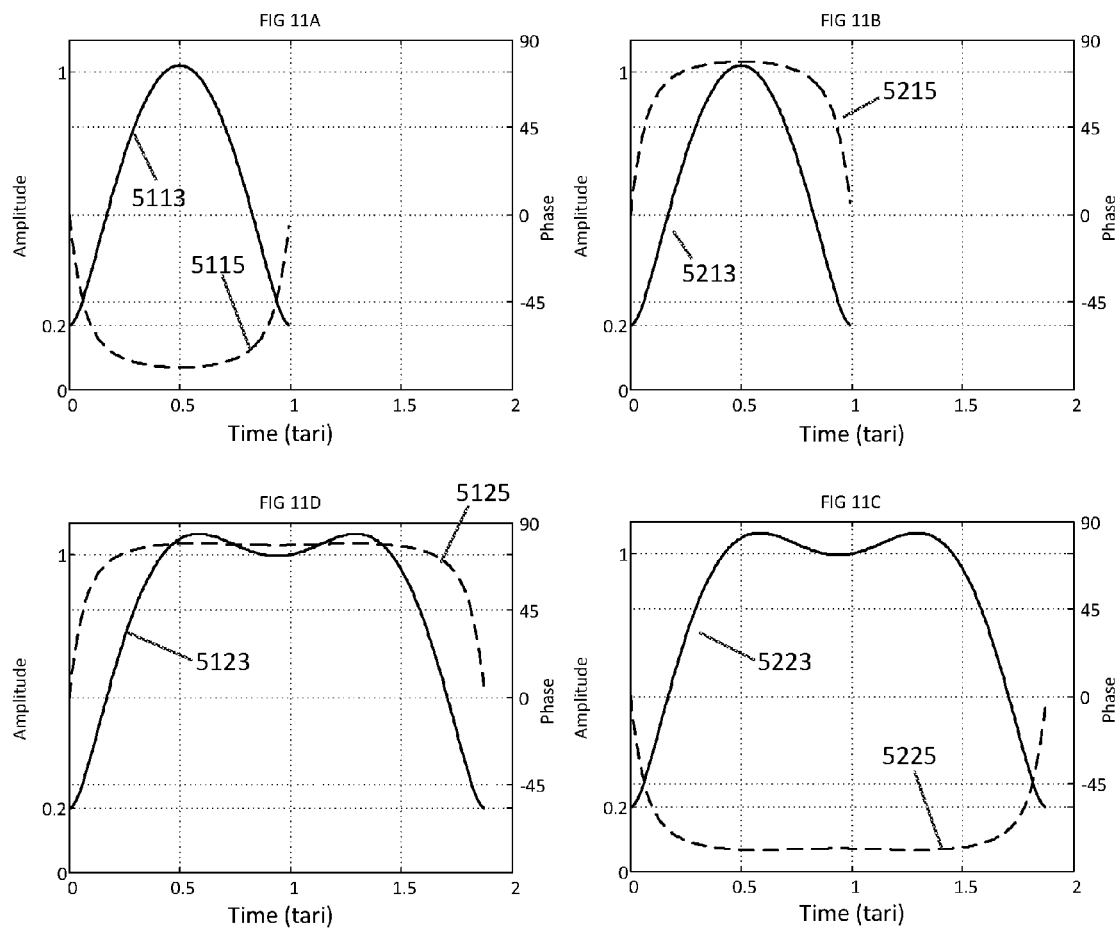
FIG. 11 are plots showing example OPR-ASK waveforms as would be used in the stored waveform table based synthesis technique of FIG. 9.

FIG. 11 shows plots of example waveforms which would be stored in memory 5000 for data-0 and data-1 as would be used for a polar modulation radio architecture. The time axis in each of the plots is normalized to tari. In FIG. 11A the positive data-0 waveform is shown, where signal 5113 is the amplitude part and signal 5115 is the phase part. In FIG. 11B the reversed phase data-0 waveform is shown, where signal 5213 is the amplitude part and signal 5215 is the phase part. In FIG. 11C the positive data-1 waveform is shown, where signal 5123 is the amplitude part and signal 5125 is the phase part. In FIG. 11D the phase reversed data-1 waveform is shown, where signal 5223 is the amplitude part and signal 5225 is the phase part. The signals are modulated along a 90 degree axis with a 0 degree orthogonal offset. This orientation was chosen for ease of plotting since the phase signal is symmetric about zero in FIG. 11. In the plots of FIG. 11, the amplitude scale is on the left half of the plots, while the phase scale (in degrees) is on the right side of the plots. Other types of waveforms such as rtcal, delimiter, etc., may be similarly constructed. The orthogonal offset used in FIG. 11 was chosen to generate 80% modulation depth, though any modulation depth from 80% to 100% is included within these concepts.

Figure 12:
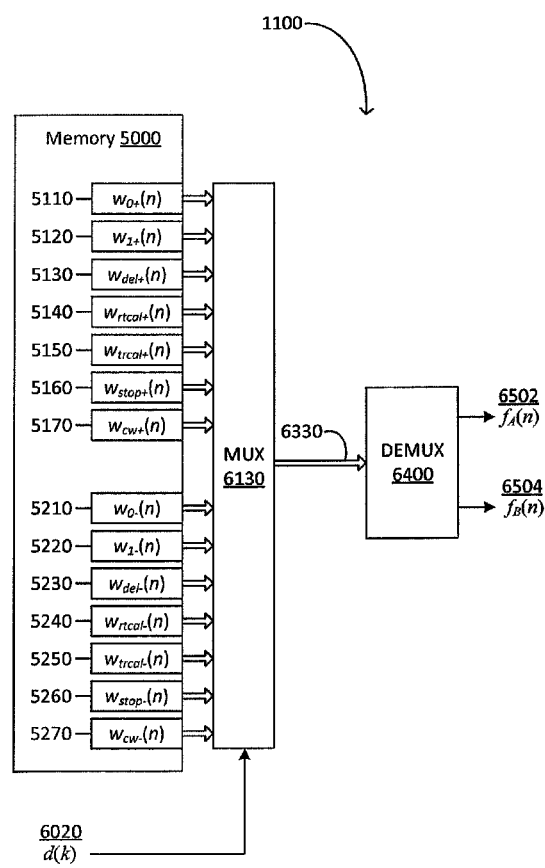
FIG. 12 is a block diagram of an alternative transmit signal synthesis technique using stored waveform tables.

FIG. 12 is a block diagram of an alternative system for DSP 1100 wherein a single mux 6130 is used to select the correct symbol waveform including which phase to read from memory. In FIG. 12, the transmitter encoding sequence d(k) 6020 may have phase information embedded in it so that the single mux 6130 has enough information to select the correct waveform. There are many possible embodiments of this concept. Three example embodiments are given here. In the first example, a unique code can be assigned to each waveform, such as 0=data-0 positive reference phase
1=data-0 reversed reference phase
2=data-1 positive reference phase
3=data-1 reversed reference phase
4=delimiter positive reference phase
5=delimiter reversed reference phase
6=rtcal positive reference phase
7=rtcal reversed reference phase
8=trcal positive reference phase
9=trcal reversed reference phase
10=stop positive reference phase
11=stop reversed reference phase
12=CW positive reference phase
13=CW reversed reference phase.

In this example, the transmitter encoding sequence d(k) 6020 in FIG. 12 would take on values between 0 and 13 to encode the RFID reader system transmissions. With this type of explicit enumeration any ordering is possible, and the above is just for illustration. More or less waveforms and symbols can be used without departing from the fundamental ideas disclosed herein.

In a second example encoding, the waveform type can be enumerated such as

0=data-0
1=data-1
2=delimiter
3=rtcal
4=trcal
5=stop
6=CW.

Then an additional field, such as an additional bit location in a binary encoded system, is used to encode the phase of the symbol. Note the manner in which the first example above was enumerated also behaves similar to this second example, since the least significant bit in that binary encoding would explicitly represent the phase. Other orderings of the symbols in the first example would not have a "phase bit field" as embodied in the second example.

In a third example encoding of the transmitter encoding sequence d(k) 6020 in FIG. 12, the phase could be represented differentially, such as by a "reverse phase bit field". The sequence encoder would set this phase reverse field when the new waveform symbol needed to be phase reversed, and the phase reverse field would be clear when the phase did not need to be reversed. The mux 6130 would have an internal phase state in this embodiment which could be preset to either positive or reversed phase as desired.

Continuing with FIG. 12, note that wide arrows such as 6330 in FIG. 12 represent complex valued signals, whether in Cartesian or polar representation. The demux 6400 separates the complex signal representation into the component signals to be output to the DACs Note that the demux 6400 may not be explicitly implemented, but could simply be a function accomplished inherently through the DSP to DAC data transfer mechanism. The component signals $f_A(n)$ 6502 and $f_B(n)$ 6504 may be Cartesian representation signals $u_1(n)$ 1202 and $u_Q(n)$ 1204 for use in a direct conversion radio such as FIG. 2, or the component signals $f_A(n)$ 6502 and $f_B(n)$ 6504 may be polar representation signals a(n) 1203 and p(n) 1205 for use in a polar modulation transmitter architecture. Therefore, while FIG. 12 refers to DSP 1100 in the direct conversion architecture, the system illustrated in FIG. 12 is equally applicable to polar modulation transmitters.

FIG. 9, FIG. 10, FIG. 11, and FIG. 12 show how to implement stored table based transmit signal synthesis using the orthogonal offset technique while still capable of incorporating nonlinear and linear predistortion into the stored waveforms. Having the nonlinear and linear predistortion incorporated into the stored waveforms is very computationally efficient. For clarity, the waveform plots of FIG. 10 and FIG. 11 do not include predistortion, but it should be obvious to those skilled in the art that it is possible and desirable to include the predistortion in the stored waveforms so that the predistortion operation does not have to be implemented separately.

Other embodiments are possible using the ideas presented here. For example, a sequence encoding could be used in FIG. 12 with no phase information, but the mux 6130 could implement all phase control by maintaining a phase state and implementing the logic to invert the phase state on all new symbols except delimiter and CW. This is similar to the polarity generation control in aforementioned patent application PCT/US2013/074897. Any such implementation is still within the spirit of this disclosure.

Hybrid waveform table based synthesis designs are possible which reduce waveform memory 5000 storage requirements by using particular modulation angle trajectories together with simple adjustments to the mux logic. For example, polar modulation along a θ=90 degree trajectory yield identical waveform envelopes but with phase symmetric about zero for the positive and negative waveforms. Likewise, Cartesian modulation along θ=0, 90, 180, or 270 degree trajectories yield symmetries in the in-phase and quadrature-phase components which may be exploited to reduce storage memory. One skilled in the art could suitably modify the phase reversal logic in the mux given the information disclosed herein. It should be noted however that these signal symmetries are typically eliminated when nonlinear baseband predistortion is included in the waveform synthesis.

Figure 13:
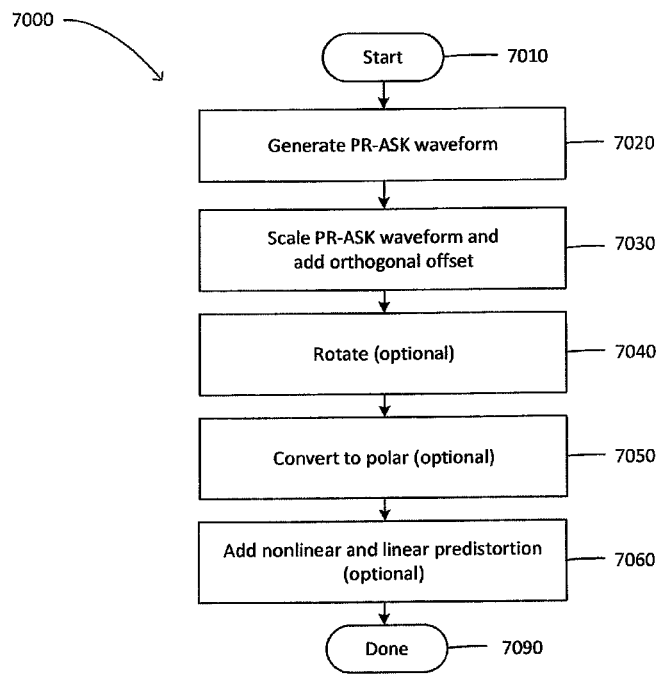
FIG. 13 is a flowchart illustrating the process for creating OPR-ASK waveforms, whether for storage in a waveform memory tables or for output to a transmitter.

FIG. 13 shows a flowchart 7000 illustrating the process of creating OPR-ASK waveforms. The flowchart starts at 7010. At step 7020 the PR-ASK waveform is generated. This can be done using conventional Nyquist filtering such as using pulse code modulation filtered by a raised cosine, or the PR-ASK waveform can be generated using an optimization algorithm such as quadratic programming. At step 7030 the PR-ASK signal is scaled as needed for the DSP numerical word size or the width of the bus interface to the transmit DAC. The orthogonal offset is also added at step 7030. The result at the end of step 7030 is the OPR-ASK waveform. At step 7040 the OPR-ASK waveform is rotated as may be desired to optimize transmit DAC word size or for other reasons. At step 7050 the OPR-ASK signal may optionally be converted to polar coordinates for use in a polar transmitter. At step 7060 the process may optionally add nonlinear and/or linear predistortion to compensate for nonlinearities, offsets, and gain/phase imbalance in the analog section of the transmitter. At step 7090 the process is finished.

Figure 14:
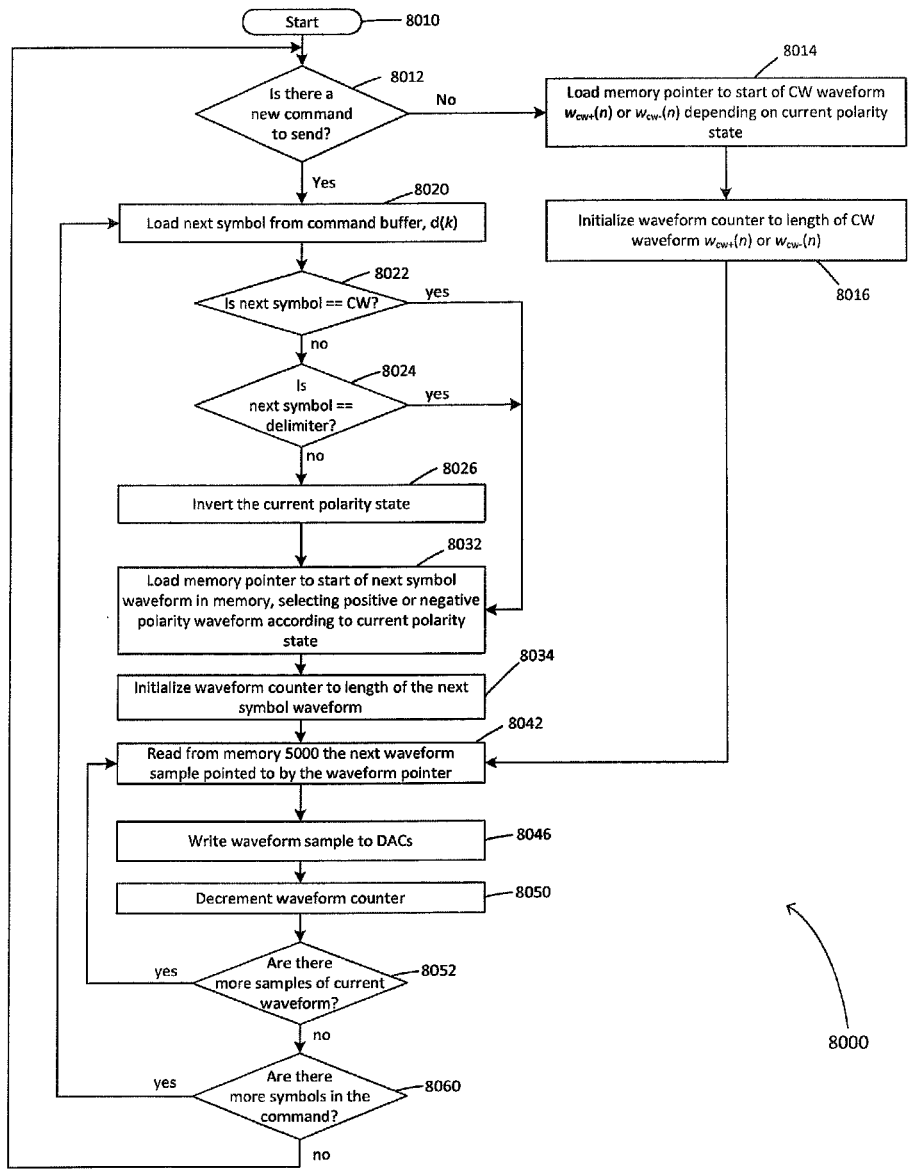
FIG. 14 is a flowchart illustrating the process for synthesizing OPR-ASK transmit signals to communication with RFID tags in an RFID system.

FIG. 14 shows a flowchart 8000 illustrating the process of synthesizing OPR-ASK signals from stored waveforms. This example embodiment follows an implementation as in FIG. 12, where a single mux control block maintains the current polarity state information and determines which version, positive or negative, of a waveform should be sent to the DACs. The flowchart starts at 8010. At step 8012 the process checks if a new RFID transmitter command is ready to be sent in the encoded symbol sequence d(k). If no new command is ready, the process continues to step 8014 where the mux selects the positive or negative CW waveform depending on the current polarity state. From there the process continues to step 8016 where the waveform length counter is initialized to the length of the CW waveform. From here, the process continues to step 8042 where it rejoins the main flow of the algorithm. Returning to step 8012, if there is a new RFID command ready to send, the process continues to step 8020 where the next symbol is read from the symbol sequence d(k). At step 8022 the process checks if the new symbol is a CW symbol, and if so continues onto step 8032. However, if the new symbol is not a CW symbol, the process continues onto step 8024 where it check if the new symbol is a delimiter. If the new symbol is a delimiter the process moves to step 8032, while if it is not a delimiter the process continues to step 8026 where the current polarity state is inverted. At step 8032 the waveform is selected based on the new symbol d(k) and the current polarity state. In example software implementations the waveform is selected by passing a pointer to the beginning of the waveform in memory. At step 8034 the mux logic initializes the waveform counter based on the length of the newly selected waveform. At step 8042 samples are read from waveform memory and at step 8046 the samples are written to the transmitter DACs. At step 8050 the sample counter is decremented and at step 8052 the counter is checked to determine if there are more samples to send. If there are more samples to send the process continues back to step 8042. On the other hand, if no more samples are in the current waveform, then the process continues to step 8060 where the symbol sequence d(k) is checked for more symbols in the command. If there are more symbols in the command, the process loops back to step 8020 to process the next waveform. However, if there are no more symbols in the command the process loops back to the start where it checks for a new command at 8012, thereby starting the process over again.

The example devices, methods, apparatus, and embodiments disclosed in this specification are not the only possible implementations. Any alternative implementation devised with the intention of shifting the trajectory of the PR-ASK signal away from the origin through the addition of a controlled offset is the same idea as disclosed herein. An alternative may be to use an offset which is not ideally orthogonal to the PR-ASK trajectory, but is intentionally skewed by a small amount such that the envelope still passes the protocol conformance requirements. Such an implementation of intentionally skewing the offset so that it is not ideally orthogonal but just mostly orthogonal, as measured by the percentage projection onto the PR-ASK trajectory verses the axis 90 degrees to the trajectory, would still be within the spirit and scope of the idea disclosed here. Yet another alternative embodiment would be to drive a transmit filter, such as a raised cosine filter or some other Nyquist filter well known to those skilled in the art, using a complex pulse code modulated signal representing the PR-ASK signal with an intentional offset. In other words, a designer could use a sequence d (m) as the encoded PR-ASK signal and algebraically add the offset to produce the sequence d (m)+jB, which can then be passed as the input to the transmit filter. The implementation could optionally rotate the input or the output of the transmit filter to put the trajectory on any desired angle. Because the transmit filter, the optional rotation, and the algebraic summation of the offset are all linear operations, the order of these operations is not important to produce the same end result. In any such implementation the sequence d (m) can be viewed as the PR-ASK generator and the summation with the offset can be viewed as the offset generator with respect to what is claimed with this specification.

The example devices and methods in this disclosure can achieve FCC and ETSI regulatory compliance with low computational complexity. In some embodiments, a general-purpose processor such as a DSP, microcontroller or microprocessor is used and non-transitory firmware, software, or microcode can be stored in a tangible storage medium that is associated with the device. Any such device may be referred to herein as a "processor" or a "microprocessor." Such a medium may be a memory integrated into the processor, or may be a memory chip that is addressed by the controller to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RFID system.

It should be noted that any data and information necessary to support the execution of instructions for any embodiment of the disclosure can be placed in a removable storage medium as well. These could be stored on a disk as well, especially for development purposes or for maintenance and update purposes. Such a storage medium may be accessed either directly or over a network, including the Internet.

Any of the example embodiments may include additional interpolation stages in the transmitter which for clarity are not shown in the diagrams. Direct conversion and polar modulation radio architectures have been discussed in this disclosure, but other radio architectures such as superheterodyne or envelope tracking transmitters are also possible and do not depart from this disclosure. Although specific embodiments have been illustrated and described herein, those of ordinary skill in the art appreciate that any arrangement which is calculated to achieve the same purpose may be substituted for the specific embodiments shown and that the disclosure has other applications in other environments. The following claims are in no way intended to limit the scope of the disclosure to the specific embodiments described herein.

The example embodiments described in this disclosure or alternative embodiments may be implemented as discrete component RFID reader designs, such as using physically separate chips for DACs, ADCs, mixers, amplifiers, mux, couplers, and the like. The waveform memory may be SRAM, DDR, FLASH, or other types of memory internal or external to the DSP processor. The DSP processor may be a digital signal processor such as a Blackfin processor from Analog Devices Inc., or it could be a more general purpose microprocessor such as one of the many variants of ARM processors, or the DSP processor could be implemented on a field programmable gate array (FPGA), or on an application specific integrated circuit (ASIC). The RFID reader implementing the disclosed concepts may also be implemented as a system-on-a-chip (SoC), wherein many of the subsystems such as the DSP, DACs, ADCs, mixers, local oscillators, etc., are integrated together on a chip. Sometimes multichip SoC solutions are used to ease the manufacturability given the variations in process which may be required based on frequency, power, and the like. Any discrete or integrated form the RFID reader may take which implements the disclosed ideas does not depart from the ideas disclosed herein.

The invention claimed is:

1. A radio frequency identification (RFID) system comprising:
a storage medium comprising a plurality of stored offset phase reversal amplitude shift keying (OPR-ASK) waveforms, each of the plurality of stored OPR-ASK waveforms representing an RFID symbol usable in a sequence of RFID symbols; and
at least one multiplexer connected to the storage medium to select one of the plurality of the stored OPR-ASK waveforms in accordance with the RFID symbol required in the sequence of RFID symbols at a given time.

2. The RFID system of claim 1 wherein the plurality of stored OPR-ASK waveforms includes both a reference waveform and a reversed phase version of the reference waveform.

3. The RFID system of claim 2 further comprising:
an RF source to produce a carrier wave; and
an RF amplifier connected to the RF source and the multiplexer for transmitting the sequence of RFID symbols modulated onto the carrier wave to synthesize an RFID transmitter waveform.

4. The RFID system of claim 3 wherein the plurality of stored OPR-ASK waveforms include at least one of linear and nonlinear predistortion applied to substantially undistorted waveforms.

5. The RFID system of claim 3 wherein the plurality of stored OPR-ASK waveforms are represented in Cartesian coordinates for use in a direct conversion transmitter.

6. The RFID system of claim 3 wherein the plurality of stored OPR-ASK waveforms are represented in polar coordinates for use in a polar modulation transmitter.

7. The RFID system of claim 3 wherein the plurality of stored OPR-ASK waveforms include a rotation.

8. The RFID system of claim 3 wherein the at least one multiplexer comprises two multiplexers, and further comprising a phase select switch connected to the two multiplexers.

9. The RFID system of claim 3 further comprising a receiver to receive an incoming RFID signal.

10. A method of producing a radio frequency identification (RFID) transmitter signal, the method comprising:
repeatedly determining, by a processor, a current polarity state for a stored offset phase reversal amplitude shift keying (OPR-ASK) waveform of a plurality of stored OPR-ASK waveforms, the stored OPR-ASK waveform corresponding to an RFID symbol in a sequence of RFID symbols;
repeatedly retrieving, by a processor, the stored OPR-ASK waveform in accordance with the current polarity state from the plurality of stored OPR-ASK waveforms, each of the plurality of stored OPR-ASK waveforms representing the RFID symbol usable in the sequence of RFID symbols; and
assembling, by the processor, the sequence of RFID symbols, each based on the stored OPR-ASK waveform corresponding to the RFID symbol in the sequence of RFID symbols.

11. The method of claim 10 wherein the plurality of stored OPR-ASK waveforms include at least one of linear and nonlinear predistortion applied to substantially undistorted waveforms.

12. The method of claim 10 further comprising modulating the sequence of RFID symbols onto a carrier wave to produce the RFID transmitter signal.

13. The method of claim 12 wherein the plurality of stored OPR-ASK waveforms include a rotation.

14. The method of claim 12 wherein the plurality of stored OPR-ASK waveforms are represented in Cartesian coordinates for use in a direct conversion transmitter.

15. The method of claim 12 wherein the plurality of stored OPR-ASK waveforms are represented in polar coordinates for use in a polar modulation transmitter.

16. Apparatus comprising:
 means for determining a current polarity state for a stored offset phase reversal amplitude shift keying (OPR-ASK) waveform of a plurality of stored OPR-ASK waveforms, the stored OPR-ASK waveform corresponding to a radio frequency identification (RFID) symbol in a sequence of RFID symbols;
 means for retrieving the stored OPR-ASK waveform in accordance with the current polarity state from the plurality of stored OPR-ASK waveforms, each stored waveform representing the RFID symbol usable in the sequence of RFID symbols; and
 means for assembling the sequence of RFID symbols each based on the corresponding stored OPR-ASK waveform.

17. The apparatus of claim 16 further comprising means for modulating the sequence of RFID symbols onto a carrier wave.

18. The apparatus of claim 17 further comprising means for receiving an incoming RFID signal.

\* \* \* \* \*